United States Patent [19]

Nix et al.

[11] Patent Number: 4,958,790

[45] Date of Patent: Sep. 25, 1990

[54] CABLE BOOT

[76] Inventors: Charles D. Nix, 1578 Slaughter Rd., Madison, Ala. 35758; Johnny P. Baker, 782 Burwell Rd., Harvest, Ala. 35749

[21] Appl. No.: 349,118

[22] Filed: May 5, 1989

[51] Int. Cl.[5] .................................................. F16L 5/00

[52] U.S. Cl. ....................................... 248/56; 248/74.3

[58] Field of Search ........................ 248/74.2, 74.3, 56, 248/52; 361/423, 427, 428; 174/65 R, 62, 64, 65 SS, 65 G, 152 G, 151; 383/75, 76; 285/236

[56] References Cited

U.S. PATENT DOCUMENTS

| | | | |
|---|---|---|---|
| 848,481 | 3/1907 | McCann | 383/76 X |
| 3,759,280 | 9/1973 | Sinanson | 285/236 X |
| 3,889,909 | 6/1975 | Koscik | 248/74.3 X |
| 4,272,870 | 6/1981 | McCormick | 248/74.3 X |
| 4,483,556 | 11/1984 | Livolsi | 285/236 X |
| 4,490,887 | 1/1985 | Sarton | 248/74.3 X |

FOREIGN PATENT DOCUMENTS

| | | | |
|---|---|---|---|
| 873697 | 7/1942 | France | 174/151 |
| 880376 | 10/1961 | United Kingdom | 174/151 |

*Primary Examiner*—J. Franklin Foss

*Attorney, Agent, or Firm*—John C. Garvin, Jr.

[57] ABSTRACT

A boot having an opening therein for receiving and securing one or more cables, hoses and/or wires passing through a hole in a wall separating two compartments. More particularly, a boot for mounting on the wall of the motorwell of a boat for receiving one or more cables, hoses and/or wires leading from the interior of a boat to an outboard motor mounted on the transom of the boat. The boot is made of a flexible material and has a full open area for passing one or more cables, hoses and/or wires therethrough and a drawstring or tie for snuggly and tightly fitting around the cables, hoses and wires. The full open area of the boot is of a size that it can readily accommodate a wide range of sizes, or number, of cables, hoses and/or wires.

9 Claims, 2 Drawing Sheets

CABLE BOOT

TECHNICAL FIELD

This invention relates generally to a boot having an opening therein for receiving and securing one or more cables, hoses and/or wires passing through a hole in a wall separating two compartments. More particularly, this invention relates to a boot for receiving one or more cables, hoses and/or wires leading from the interior of a boat to its motorwell and to an outboard motor mounted on the boat.

BACKGROUND OF THE INVENTION

Boots for mounting on the wall of a motorwell of boats for receiving cables, hoses and/or wires have been in use for many years. Prior art boots for such use have generally been made from either a hard or soft material such as plastic, rubber or vinyl. When hard material was utilized for the boot, a person, when rigging a boat, would have to select a boot having an opening therein slightly larger than the cumulative sizes of the cables, hoses and/or wires which he anticipated would be required in the rigging process. Such boots have not been in great use in recent years since they had the disadvantage of causing a supplier to stock boots having several sizes of openings therein and were deemed impracticable. Prior art boots made of soft rubber or vinyl generally included a plurality of raised tiers which required the person rigging the boat to cut or split the boot to the approximate size of the cumulative sizes of the cables, hoses and/or wires anticipated to be required in the rigging process. An example of this type of prior art is shown in FIG. 6 of the drawings. Both types of prior art boots had many disadvantages; e.g., the boot would not normally fit snuggly or tightly around the hoses, cables and/or wires; if, at a later date, either the boat or outboard motor was modified to require fewer cables, hoses or wires to pass from the interior of the boat through the opening in the boot, the size of the opening in the boot would be excessive; and for these reasons, there would be no tight or snug fitting of the boot around the cables, hoses or wires to prevent water from going through the openings in the boot and wall of the motor well into the interior of the boat.

The instant invention relates to a boot for mounting on the wall of the motorwell which overcomes the numerous disadvantages of the prior art boots. No longer is it necessary to select from numerous boots or to cut or split the boot when rigging a boat. This invention pertains to a boot having a full open area for passing one or more cables, hoses or wires therethrough when rigging a boat, and to simply pull a tie or drawstring snuggly or tightly around the cables, hoses or wires to complete the installation. The full open area provided in the boot of the instant invention is of size that it can readily accommodate a wide range of sizes, or number, of cables, hoses or wires. If, at a later date, it becomes necessary or desirable to pass more or less cables, hoses or wires through the opening in the boot, it can be readily accomplished by loosening or cutting the tie or drawstring, and replacing only the tie or drawstring, at the user's option.

It is an object of the present invention to provide a relative inexpensive boot for receiving cables, hoses or wires passing through a hole in a wall separating compartments of a structure.

It is a further object of the present invention to provide such a boot for mounting on the wall of a motorwell of a boat and which is capable of being closed to fit snuggly and tightly around cables, hoses or wires passing through the opening in the boot.

It is still a further object of this invention to provide such a boot in which the means for closing the opening of the boot snuggly or tightly around the cables, hoses or wires is a tie or drawstring.

Additional benefits and advantages of the present invention will become apparent to those skilled in the art to which this invention relates from the subsequent description of the preferred embodiment and the appended claims, taken in conjunction with the accompanying drawings.

DESCRIPTION OF THE PREFERRED EMBODIMENT

Figure 1:
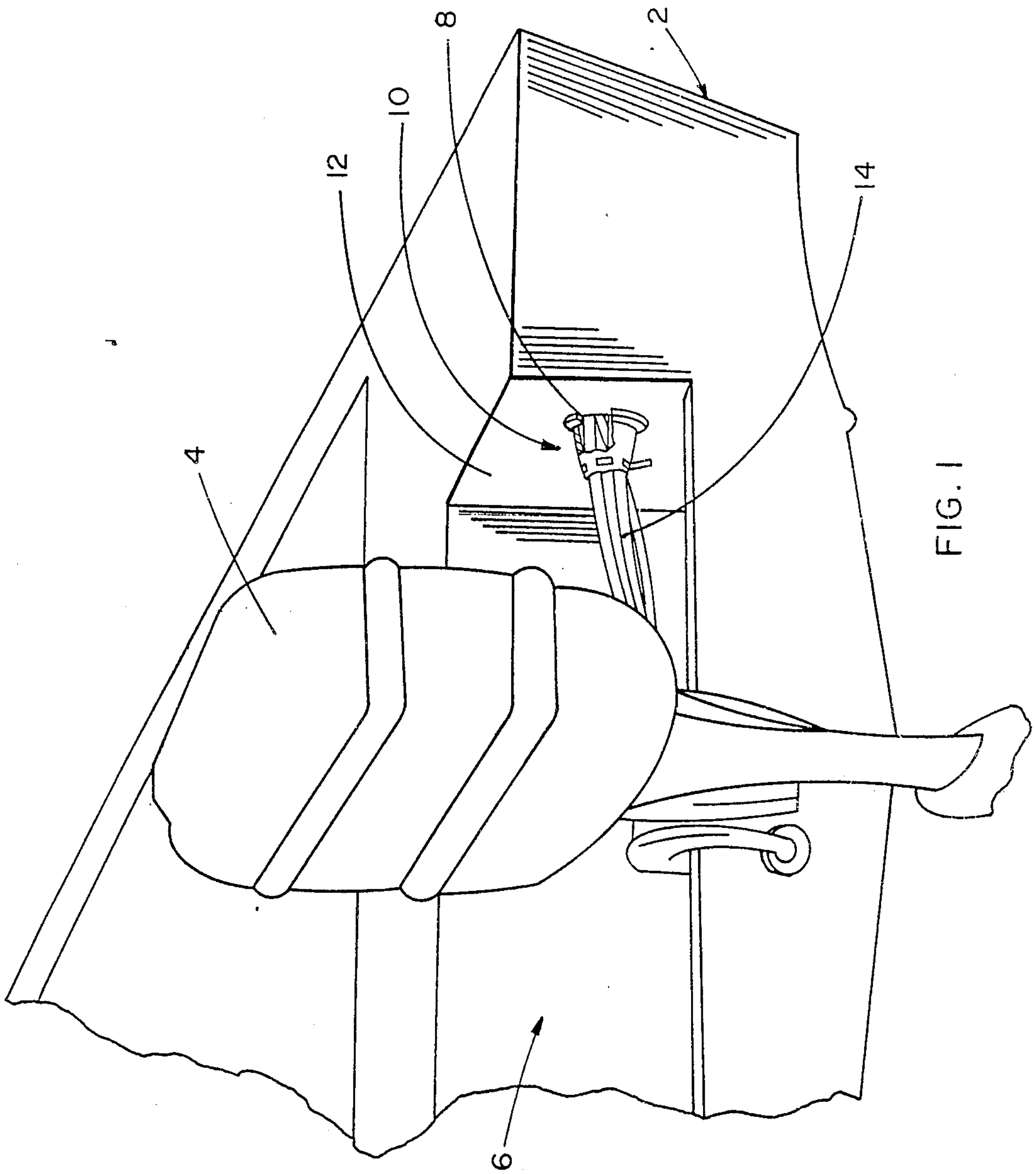
FIG. 1 is a perspective view showing a typical setting for the cable boot of the present invention, with a portion thereof being broken away to show the hole in the wall of the motorwell of a boat and the cables, hoses or wires, as mounted on the wall of the motorwell of a boat.
Figure 6:
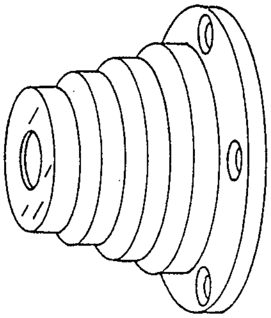
FIG. 6 is a perspective view of a common type of prior art cable boot.

FIGS. 1–5 illustrate, by way of example, the preferred embodiment of the invention. FIG. 1 shows the preferred embodiment of the invention as installed on the wall 12 of the motorwell 6 of boat 2.

Figure 2:
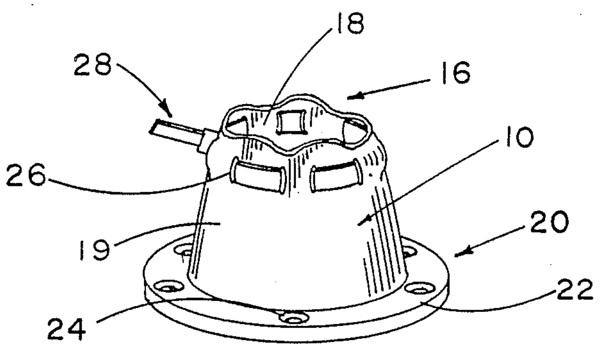
FIG. 2 is a perspective view of the cable boot of the present invention which the drawstring or tie partially tightened.
Figure 3:
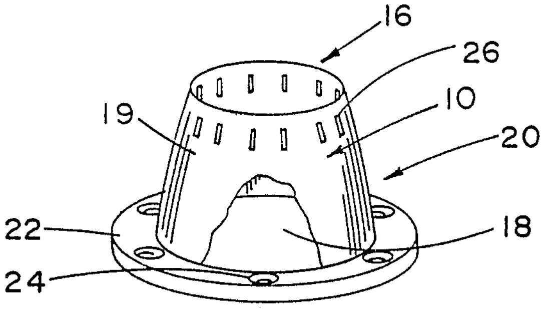
FIG. 3 is a persepective view of the cable boot of the present invention with a portion of the boot being broken away to show the opening through the center of the boot.
Figure 4:
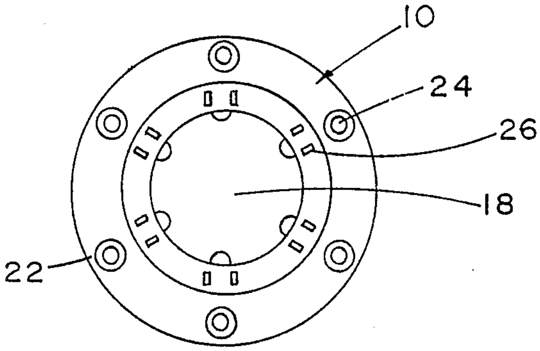
FIG. 4 is a bottom elevational view of the cable boot looking through the opening in the boot from its end having the greatest diameter.
Figure 5:
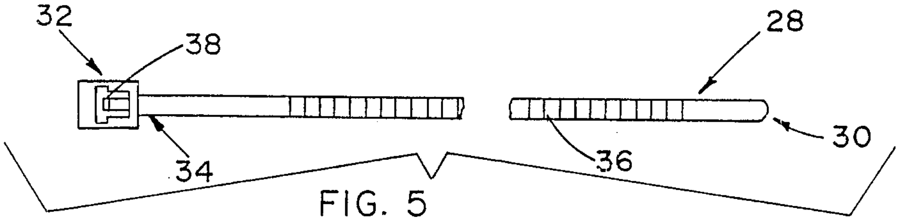
FIG. 5 is a plan view showin the details of a preferred embodiment of a drawstring or tie for use in closing the opening in the boot.

As seen in FIGS. 1–5, the boot 10 includes a circular base 22 connected to a generally frustoconical body section 19. Circular base 22 has a plurality of openings 24 therein for receiving screws, rivets or other suitable means for mounting the boot generally concentrically over a hole 8 cut into the wall panel 12 of motorwell 6 of boat 2. Frustoconical body section 19 is connected to circular base 22 at its large end 20 and has a plurality of spaced slits 26 adjacent its small end 16. Boot 10 is hollow from base 22 throughout its frustoconical body section 19 to define an opening 18 for readily receiving cables hoses and/or wires 14 leading from the interior of boat 2 to the outboard motor when rigging a boat. FIG. 2 and 5 illustrate, for example, one embodiment of a tie or drawstring 28 for closing the small end 16 of boot 10 after completion of the rigging of the boat. The tie or drawstring 28 illustrated in the drawings is a strap made of a conventional plastic material. The strap has a locking mechanism 32 at one of its ends 34, a reduced portion 30 at its other end, and a series of notches 36 cut therein substantially throughout its length for engagement by the locking mechanism 32. The locking mechanims comprises a hollow housing 32 having a tooth 38 extending therein at an angle to engage one of the notches 36 in the strap. The angle of tooth 38 is such that it readily permits movement of the strap with its notches 36 in one direction, but causes a locking effect when the strap is moved in the opposite direction.

To rig a boat, a hole 8, approximately the diameter of the opening 18 of the large end 20 of boot 10, is cut in the panel wall 12 of motorwell 6 of boat 2. Boot 10, with the tie or drawstring 28 already inserted in the spaced slits 26 in the small end 16 of body section 19, as shown in FIG. 2, is mounted to the wall 12 of motorwell 6 generally concentrically around hole 8 by conventional means, such as screws or rivets, which extend through each of the openings 24 in the circular base 22 of boot 10, and wall 12 of motorwell 6. The cables, hoses and/or wires are passed from the interior of the boat through hole 8 in wall 12 of motorwell 6, and the fully open area 18 of boot 10 to the outboard motor 4 mounted on the boat. After the cables, hoses and/or wires have been passed through the boot 10, the rigging of the boat can be completed by simply pulling on the free end 30 of tie or drawstring 28 until the small end of body section 19 of boot 10 closes around the cables, hoses and/or wires 14 to snuggly and tightly engage the cables, hoses and/or wires 14, at which time, tooth 38 of locking mechanism 32 engages the wall of one of the notches 34 in the strap.

While the above description constitutes a preferred embodiment of the present invention, it will be appreaciated that the invention is susceptible to modification, variation and change without departing from the proper scope and fair meaning of the accompanying claims.

I claim:

1. The combination comprising a panel separating first and second compartments of a structure, said panel including an annular edge defining a hole in communication with each of said compartments, a hollow boot mounted on said panel within said second compartment generally concentrically of said hole, said boot being adaptable to receive one or more cables or wires passing from said first compartment to said second compartment, said boot including a generally cylindrical body section, a base connected to a first end of said body section, and means on a second end of said body section for closing the boot tightly and snuggly around said one or more cables, hoses and/or wires, said means for closing said boot comprising a series of spaced slits in said second end of said body section and a drawstring interlaced between the walls of said slits.

2. The combination of claim 1 wherein said body section is frustoconical in cross section with said first end thereof having a diameter slightly larger than that of said second end thereof.

3. The combination of claim 2 wherein said interlaced drawstring comprises a strap having a first end, a second end, and an intermediate section, a locking mechanism at said first end of said strap, a reduced portion at said second end of said strap, and a series of notches in said intermediate section of said strap for engagement by said locking mechanism.

4. The invention of claim 1 wherein said interlaced drawstring comprises a strap having a first end, a second end, and an intermediate section, a locking mechanism at said first end of said strap, a reduced portion of said second end of said strap for engagement by said locking mechanism.

5. The invention of claim 4 wherein said locking mechanism includes a tooth for engagement with the wall of one of said spaced notches.

6. A cable boot mountable in a motorwell of a boat and disposed for receiving and passing one or more cables, hoses and/or wires through said motorwell and through an opening in bulkheads separating said motorwell from adjacent compartments of said boat, said boot comprising a body resistant to ultraviolet rays, gasoline and oil and having a first open end provided with an outwardly extending flanged portion and a second open and disposed in communication and in spaced relation with said first end, said body having a plurality of spaced slits disposed adjacent said second end, said slits forming a wall portion therebetween; a drawstring interlaced between said wall portions for closing said second end of said boot tightly around said cables.

7. A cable boot as set forth in claim 6 wherein said boot is provided with a frustroconical cross sectional configuration with said opening of said first end being larger than the said opening of said second end.

8. The invention of claim 8 wherein said interlaced drawstring comprises a strap having a first end, a second end, and intermediate section, a locking mechanism at said first end of said strap, a reduced portion of said second end of said strap, and a series of notches in said intermediate section of said strap for engagement by said locking mechanism.

9. The invention of claim 8 wherein said locking mechanism includes a tooth for engagement with the walls of one of said spaced notches.

* * * * *